United States Patent
Williams et al.

(10) Patent No.: US 6,189,324 B1
(45) Date of Patent: Feb. 20, 2001

(54) ENVIRONMENT CONTROL UNIT FOR TURBINE ENGINE

(76) Inventors: Samuel B. Williams, 1625 Lochridge, Bloomfield Hills, MI (US) 48302; John F. Jones, 1870 Wiltshire, Berkley, MI (US) 48072; Robert S. Thompson, Jr., 6056 Brighton Rd., Brighton, MI (US) 48116

(*) Notice: Under 35 U.S.C. 154(b), the term of this patent shall be extended for 0 days.

(21) Appl. No.: 09/412,137

(22) Filed: Oct. 5, 1999

(51) Int. Cl.[7] ............................................. F28B 9/00
(52) U.S. Cl. ........................................ 62/172; 62/402
(58) Field of Search ............................ 62/86, 87, 401, 62/172, 402

(56) References Cited

U.S. PATENT DOCUMENTS

| | | | |
|---|---|---|---|
| 4,445,342 | * | 5/1984 | Warner ..................................... 62/172 |
| 5,086,622 | * | 2/1992 | Warner ..................................... 62/402 |
| 5,704,218 | * | 1/1998 | Christians et al. ....................... 62/402 |
| 5,860,283 | * | 1/1999 | Coleman et al. ......................... 62/402 |
| 5,934,083 | * | 8/1999 | Scherer et al. .......................... 62/172 |
| 5,956,960 | * | 9/1999 | Niggeman ................................ 62/172 |

OTHER PUBLICATIONS

SAE Technical Paper Series 932057, "What's Next in Commercial Aircraft Environmental Control Systems?" By Kim Linnett and Robert Crabtree. Copyright 1993 Society of Automotive Engineers, Inc.

* cited by examiner

*Primary Examiner*—Ronald Capossela
(74) *Attorney, Agent, or Firm*—Lyon P.C.

(57) ABSTRACT

An environmental control unit to supply cool dry air to an aircraft cabin has a plurality of bleed air sources from an aircraft engine compressor supplying working fluid to an air cycle cooling circuit. An electronic control computer having a plurality of inputs and selects a bleed air source depending upon cabin cooling and pressurization requirements. A speed control valve responsive to an output from the control computer, modulates the flow of working fluid through a turbo-alternator, thereby synchronizing the frequency of electrical power produced by the turbo-alternator with that of an aircraft engine alternator. The turbo-alternator supplies additional electrical power to the aircraft, thereby minimizing the deleterious effect of warm air bled from the engine compressor on aircraft performance.

18 Claims, 5 Drawing Sheets

ENVIRONMENT CONTROL UNIT FOR TURBINE ENGINE

TECHNICAL ART

The instant invention relates generally to air cooling systems and more specifically to an environmental control unit for supplying cool, dry air to an aircraft cabin.

BACKGROUND OF THE INVENTION

The instant invention relates generally to air cycle machines used to produce a cool air supply and more particularly to an environmental control unit integrated with a gas turbine engine to provide cabin ventilation and temperature and pressure control in a jet aircraft application. Ram air and/or bypass duct air are used to cool pressurized, compressed air bled from the engine compressor. The compressed air further cools as it expands through a turbine.

Prior art aircraft environmental control units utilize high pressure air bled from the compressor section of a turbine engine to supply working fluid to an air-cycle machine for production of pressurized cooling air to an aircraft cockpit/cabin. A basic bootstrap air-cycle machine comprises a small compressor driven by bleed air mechanically coupled to a turbine. The hot compressed air exiting the compressor is introduced to a heat exchanger where it is partially cooled by cooling air obtained from, for example, an air bypass duct used to exhaust a portion of "ram" air entering the engine. The partially cooled air is then directed to the turbine of the bootstrap cycle machine and is further cooled as it expands through the turbine prior to introduction to the aircraft cabin.

Many prior art environmental control systems employ ground air fans to introduce cooling air into the heat exchangers when the aircraft is stationary. This feature provides cooler cabin air when ram air or bypass duct air is unavailable. Combined simple/bootstrap cycle air machines incorporate a fan stage between the compressor and turbine thereby reducing the number of parts required to introduce cool air into the turbine and heat exchanger and improving cost and efficiency.

Environmental control units are often equipped with water separators to remove moisture from the air prior to introduction in to the cabin. Various air filtration systems are also employed to remove particulate matter and odors deleterious to passenger health and comfort. Digital electronic controls employed to monitor and actuate system components provide maximum efficiency of operation and passenger comfort.

The use of compressed air to drive the aforementioned air-cycle machines reduces the volume of air available for engine combustion, thereby reducing available power and fuel efficiency. Additionally, since not all cooling air produced by the environmental control units is required for cabin ventilation and cooling, some energy is always wasted. While the application of digital electronic controllers to monitor system operation and cabin demand has improved the operating efficiency of existing environmental control units, a great deal of energy is still exhausted from known in the art air-cycle turbine.

SUMMARY OF THE INVENTION

The instant invention overcomes the aforementioned problems by providing an environmental control unit to produce cooled air for an aircraft that utilizes multiple aircraft engine compressor bleed air ports to supply an air cycle cooling circuit with working fluid. A digital electronic control is employed to control a plurality of flow valves so that low pressure bleed air to supplies the air cycle cooling circuit when aircraft cooling requirements are minimal, and higher pressure bleed air is used when conditions so demand. The electronic control is used to monitor all environmental control unit temperatures, pressures, and rotational velocities and position all system control valves and dampers.

The air cycle cooling circuit employs a plurality of heat exchangers to cool the working fluid bled from the compressor prior to its entry into an air cycle turbine. As the working fluid expands through the turbine, it cools and effects rotation of the turbine. In order to utilize the energy that otherwise would be wasted by the expansion of the working fluid, the turbine drives an alternator to produce alternating current electrical power for the aircraft.

Additionally, the instant invention provides a heat exchanger disposed in an aircraft engine bypass duct to assist in cooling the working fluid. This arrangement is thermodynamically desirable since heat from the working fluid is added to the bypass fluid of the engine prior to exiting the engine, thereby increasing it's energy and it's ability to propel the aircraft.

In a preferred embodiment of the instant invention the electronic control is employed to synchronize the speed of the air cycle turbine alternator with the speed of the engine alternator, to produce electrical power at identical frequencies. This embodiment of the instant invention efficiently utilizes the energy bled from the compressor in the form of compressed air to produce usable electrical power for the aircraft without the need for ancillary power conditioning components. In an alternative embodiment of the instant invention the power output of the turbo-alternator is conditioned in a voltage rectifier to produce direct current power for the aircraft's direct current power bus. This embodiment of the instant invention obviates the need for precise sychronization of alternator speeds while allowing the power produced by the environmental control unit turbo-alternator to be available for use by the aircraft systems at all times.

In an alternative embodiment of the instant invention, the turbo-alternator is used to drive a compressor in a bootstrap cycle arrangement. This embodiment of the instant invention allows low pressure air to be bled from the engine compressor as a source of working fluid, and then compressed by the environmental control unit compressor thereby reducing the deleterious effect of compressor bleed on aircraft engine performance.

Therefore, one object of the instant invention is an environmental control unit to produce cooling air for an aircraft cabin that demands minimal energy from an aircraft engine.

A further object of the instant invention is an environmental control unit that produces electrical power to be used by an aircraft.

A yet further object of the instant invention is an environmental control unit that returns a portion of the heat energy bled from an aircraft engine to operate the control unit back into the propulsion stream thereof.

Additional objects, features, and advantages of the present invention will become apparent from the subsequent detailed description, taken in conjunction with the accompanying drawing figures.

BRIEF DESCRIPTION OF THE DRAWINGS

FIG. 7 is a block diagram of an environmental control unit in accordance with an alternative embodiment of the present invention.

DETAILED DESCRIPTION OF THE PREFERRED EMBODIMENT(S)

Figure 1:
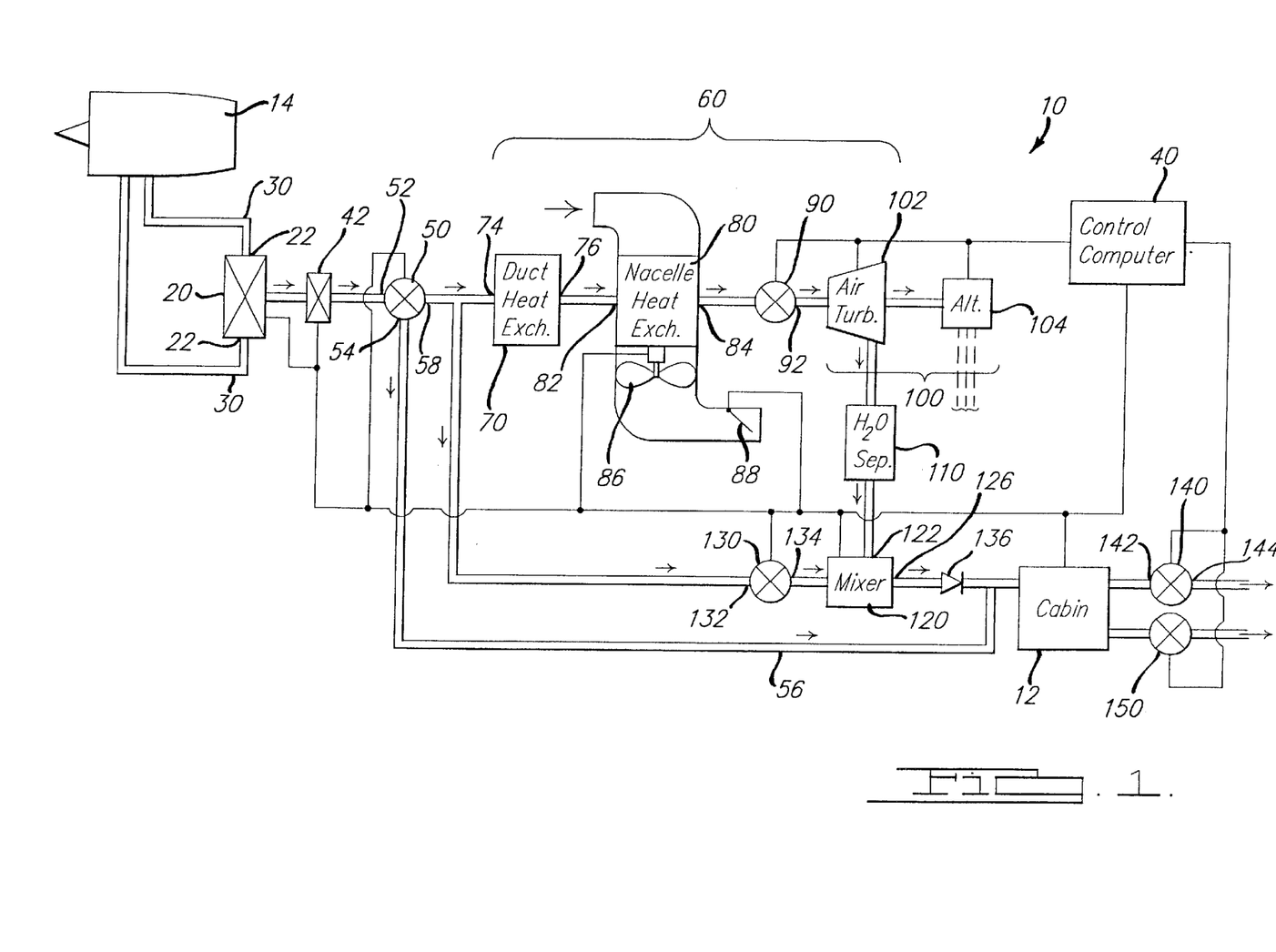
FIG. 1 is a block diagram of an environmental control unit in accordance with the present invention.

Referring to drawing FIG. 1 and in accordance with a preferred embodiment of the instant invention, an environmental control unit 10 for an aircraft having a cabin 12 capable of pressurization and a turbine engine 14 comprises a bleed air selector 20 for selecting one bleed air line 30 from a plurality thereof. The bleed air lines 30 are in fluid communication with a compressor section of the turbine engine 14, to deliver pressurized air from high pressure and low pressure air flow areas within the compressor, thereby providing a plurality of bleed air sources 30.

The bleed air selector 20 comprises an electrically operated valve having a plurality of inlet ports 22 responsive to a control processor 40 having a plurality of inputs and outputs. The control processor 40 may be a stand-alone processor dedicated to operation of the environmental control unit 10, or an integral part of an existing aircraft control processor, and has a plurality of inputs and outputs for monitoring and controlling aircraft systems. The processor 40 may comprise an analog or digital microprocessor or any equivalent thereof. Although the preferred embodiment of the instant invention utilizes a conventional digital microprocessor, it is readily understood by one having ordinary skill in the art that alternative means such as relay logic circuitry, analog processors, analog to digital converters and TTL logic circuitry may be employed as processor means to practice the instant invention. The bleed air selector 20 is positioned, responsive to an output from the processor 40, to allow either high pressure or low pressure bleed air to flow therethrough depending upon cabin 12 pressurization and ventilation requirements.

A mechanical pressure regulator 42 in fluid communication with the bleed air selector 20 is disposed downstream thereof to limit the pressure of the bleed air, hereinafter working fluid, to a predetermined maximum prior to its introduction to downstream elements of the environmental control unit 10, thereby preventing damage due to over-pressurization.

An electrically operated selector valve 50 having an inlet 52 in fluid communication with the pressure regulator 42 has a first outlet 54 in fluid communication with the cabin 12 of the aircraft via a full bleed air line 56, and a second outlet 58 in fluid communication with an air cycle cooling circuit 60, explained in detail hereinbelow. The selector valve 50 is positioned responsive to an electrical output from the control computer 40 when an input thereto indicative of a catastrophic failure of the environmental control unit 10 is received. In the event of such a failure, the first selector valve 50 is actuated to provide compressor bleed air directly to the aircraft cabin 12 via the full bleed air line 56, to maintain the pressurization thereof by preventing the flow of working fluid to the environmental control unit 10 through the second outlet 58 and providing full flow of working fluid through the first outlet 54. If desired, the maximum flow of working fluid supplied to the cabin 12 in an emergency may be limited by means of an orifice (not shown) located in the full bleed air line 56 to prohibit over-pressurization of the aircraft cabin 12.

Figure 2:
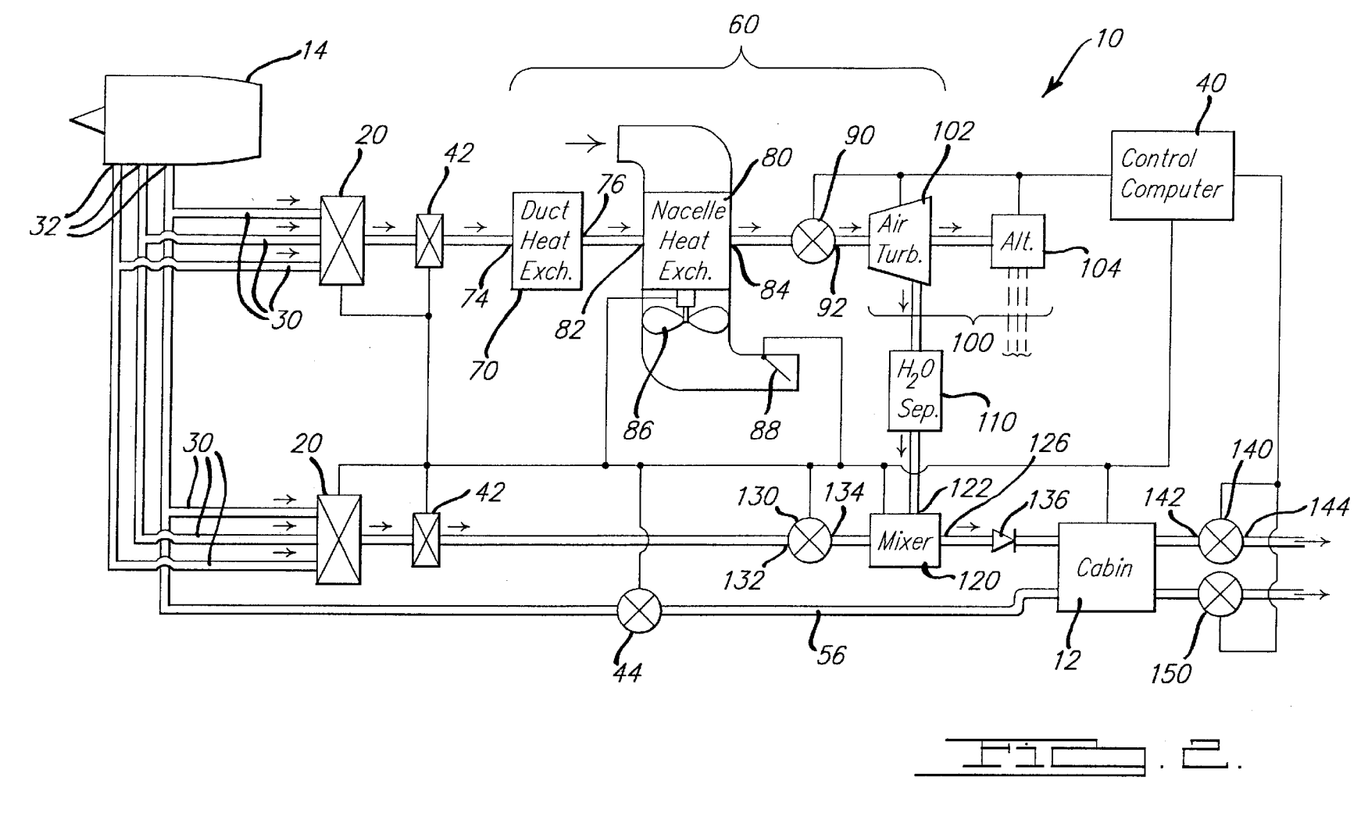
FIG. 2 is a block diagram of an environmental control unit in accordance with an alternative embodiment of the present invention.

As shown in FIG. 2, and in accordance with an alternative embodiment of the instant invention, a plurality of bleed air lines 30 connected to a plurality of ports 32 in the compressor section of the engine 14 are in fluid communication with first and second bleed air selector valves 20 for selecting one bleed air line 30 from the plurality thereof. Each bleed air selector valve 20 has an outlet 22 in fluid communication with first and second mechanical pressure regulators 42 to limit the pressure of the bleed air introduced downstream thereof. The outlet of the first pressure regulator 42 is in fluid communication with the air cycle cooling circuit 60 as disclosed in detail hereinbelow. The outlet of the second pressure regulator 42 is in fluid communication with a temperature control valve 130, for supplying bleed air at a variety of temperatures and pressures, also discussed fully hereinbelow.

A one of the plurality of bleed air lines 30 is in fluid communication with a full bleed valve 44. The full bleed valve 44 is electrically operated responsive to an output from the control computer 40 and has an outlet to supply bleed air to the full bleed air line 56 in the event of a catastrophic failure of the environmental control unit 10, as previously disclosed. This embodiment of the instant invention, utilizing multiple bleed air ports 32 at various pressure levels reduces the pressure drop across the temperature control valve 130 and the full bleed valve 44, and thereby reduces the deleterious effect on engine 14 performance caused by removing pressurized air therefrom since a portion of the bleed air may be extracted from a lower pressure point in the compressor cycle.

The air cycle cooling circuit 60 comprises a bypass duct heat exchanger 70 arranged in series with a nacelle heat exchanger 80 in fluid communication with a turbo-alternator 100 that simultaneously supplies electrical power and cooled, pressurized air to the aircraft cabin 12. Working fluid flowing through the second outlet 58 of the selector valve 50 supplies the air cycle cooling circuit 60.

Figure 3:
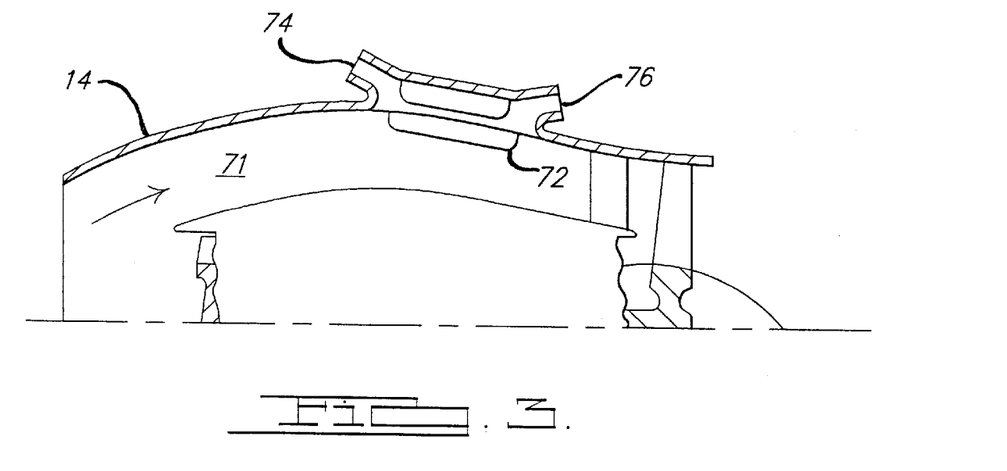
FIG. 3 is a cross-sectional view of a bypass duct heat exchanger in accordance with the present invention.
Figure 4:
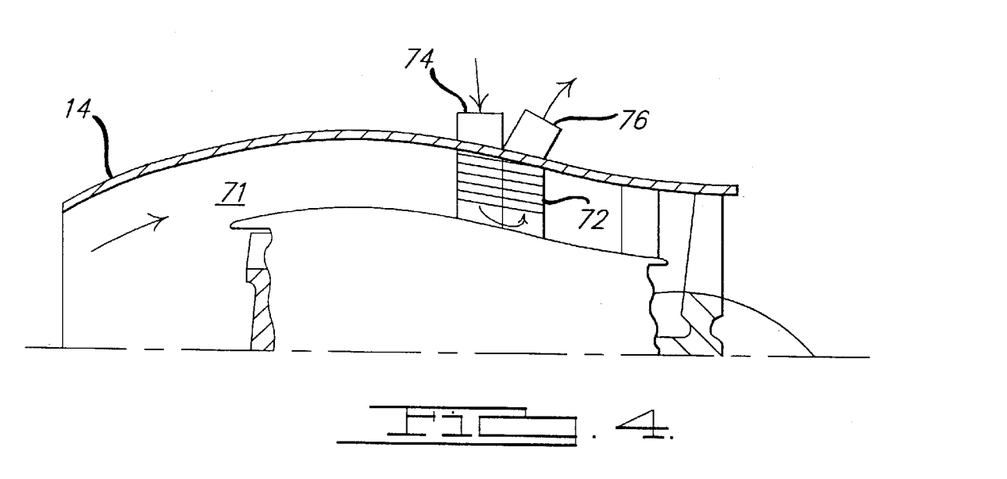
FIG. 4 is a cross-sectional view of a cross-flow bypass duct heat exchanger in accordance with the present invention.

As best seen in FIGS. 3 and 4, the bypass duct heat exchanger 70 is disposed in a bypass duct 71 of the turbine engine to utilize fluid flow radially outwardly of the engine compressor as a cooling fluid to remove heat from the pressurized working fluid in the air cycle cooling circuit 60. The location of the bypass duct heat exchanger 70 in the engine bypass duct 71 is thermodynamically advantageous as the heat removed from the working fluid is added to the bypass fluid of the engine, thereby increasing the energy thereof prior to entry into a propelling nozzle (not shown). This feature of the instant invention takes maximum advantage of the heat energy contained in the working fluid by adding a portion thereof to the bypass flow stream used for aircraft propulsion.

The bypass duct heat exchanger 70 employs a tubular or brazed aluminum plate-fin construction heat exchanging element 72, well known to one of ordinary skill in the art. As shown in FIG. 3, the bypass duct heat exchanger 70 is oriented to allow the heat exchanging element 72 to protrude into the cooling fluid flow through the bypass duct 71. Working fluid is directed into the inlet 74 of the heat exchanger 70, thence across the heat exchanging element 72, whereupon the partially cooled working fluid exits through a heat exchanger outlet 76.

In an alternative embodiment of the instant invention as shown in FIG. 4, the bypass duct heat exchanger 70 comprises a plurality of heat exchanging elements 72 in a two-pass cross flow configuration, thereby providing greater surface area and greater heat transfer capability. This embodiment of the instant invention allows working fluid to pass twice through the cooling airflow provided via the bypass duct 71.

Referring again to FIGS. 1 and 2, the working fluid exiting the bypass duct heat exchanger 70 outlet 74 is in fluid communication with a nacelle heat exchanger 80 disposed in the engine nacelle. Working fluid enters the nacelle exchanger 80 through an inlet 82 and is further cooled by ram air entering the engine and flowing through the nacelle heat exchanger 80. The nacelle heat exchanger 80 utilizes a conventional brazed aluminum plate-fin heat exchanging element commonly used in air-cycle machinery, as is well known to one of ordinary skill in the art.

The nacelle heat exchanger 80 encloses an electrically operated fan 86 therein as shown in FIGS. 1 and 2. The fan 86 is actuated by an output from the control computer 40 responsive to an input from the aircraft indicating inadequate ram air speed into the heat exchanger 80 to supply sufficient cooling air thereto, and is operated to enhance cooling air flow therein. This feature of the instant invention is particularly useful when the aircraft is not airborne and no significant ram air is available as a cooling fluid to the nacelle heat exchanger 80. Once the aircraft attains sufficient speed and altitude to supply the necessary ram air for cooling, the electrically operated fan 86 is deactivated by the control computer 40 to reduce the energy load required to be produced by the aircraft engine(s) 14.

The nacelle heat exchanger 80 has an outlet 84 in fluid communication with an electrically operated speed control valve 90. The speed control valve 90 is responsive to a variable output from the control computer 40 and is provided with an outlet 82 for supplying working fluid to a turbo-alternator 100. The turbo-alternator 100, as is known to one of ordinary skill in the art, is comprised of a turbine section 102, commonly comprising a concentric series of turbine wheels mounted on a shaft having an axis concentric with the turbine wheel axes. The shaft is mechanically coupled to and drives a high speed alternator 104 to produce electrical power, typically alternating current power. The high speed alternator 104 is electrically connected to an alternating current bus 106 used to supply the aircraft with electrical power.

In an alternative embodiment of the instant invention an electrically operated outlet damper 88 is positioned to restrict the outlet 84 of the nacelle heat exchanger 80 when in the closed position, thereby reducing the flow of fluid through the heat exchanger 80. The outlet damper 88 is opened or closed responsive to an output from the control computer 40 based on the speed of the aircraft and the amount of cooling air required for the cabin 12. For example, when cooling air requirements for the cabin 12 are readily met by operation of the environmental control unit 10, the outlet damper 88 may be moved to a position whereby the flow of cooling air through the outlet 84 is partially restricted, thereby producing thrust to enhance the performance of the engine. In contradistinction, where greater flow of cooling air is required, the outlet damper 88 may be moved to a fully open position to allow maximum cooling airflow through the nacelle heat exchanger 80, and reduce drag through the nacelle heat exchanger 80.

Figure 5:
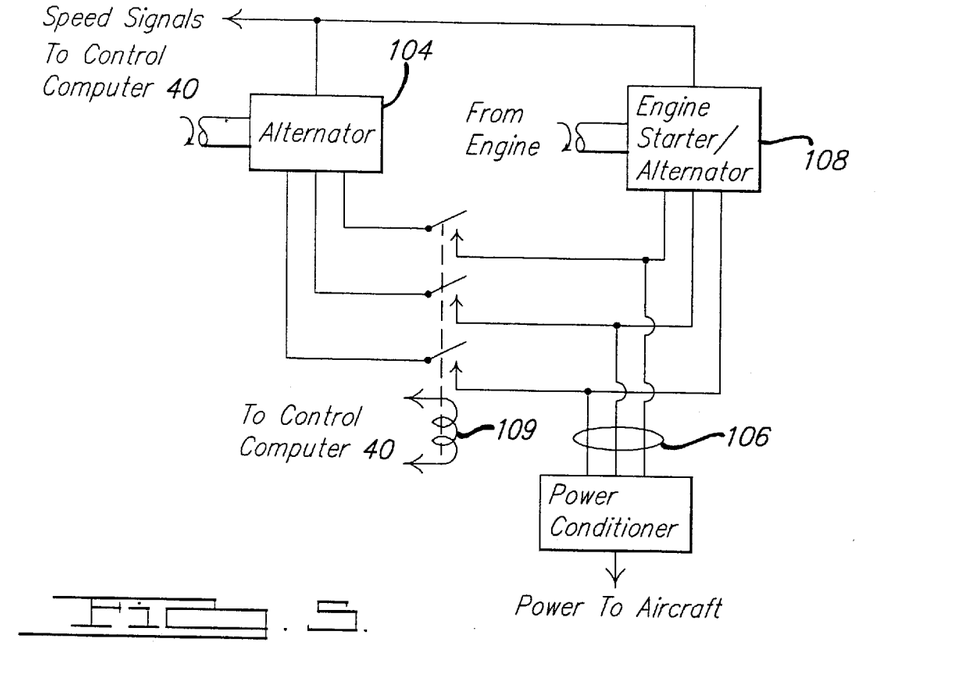
FIG. 5 is an electrical schematic in accordance with the present invention.

As shown in FIG. 5, the high speed alternator 104 is electrically connected in parallel to, for example, an alternator/starter 108 driven by the turbine engine and/or a power conditioning system commonly employed in aircraft applications to supply electrical power to ancillary aircraft control systems. In this embodiment of the invention the speed control valve 90 is modulated by an output from the control computer 40 to control the flow of working fluid entering the turbo-alternator 100, thereby synchronizing the rotational velocity of the turbo-alternator 100 with that of the engine alternator/starter to eliminate the frequency differential between the two parallel electrical power sources.

In the preferred embodiment of the instant invention the control computer 40 accepts a pair of inputs indicative of the rotational velocities of the turbo-alternator 100 and the engine alternator/starter respectively. The control computer 40 then varies the output to the speed control valve 90 based upon the difference between the respective speed indices, thereby matching the speed of the engine alternator with the speed of the turbo-alternator 100 by varying the working fluid supplied thereto.

Figure 6:
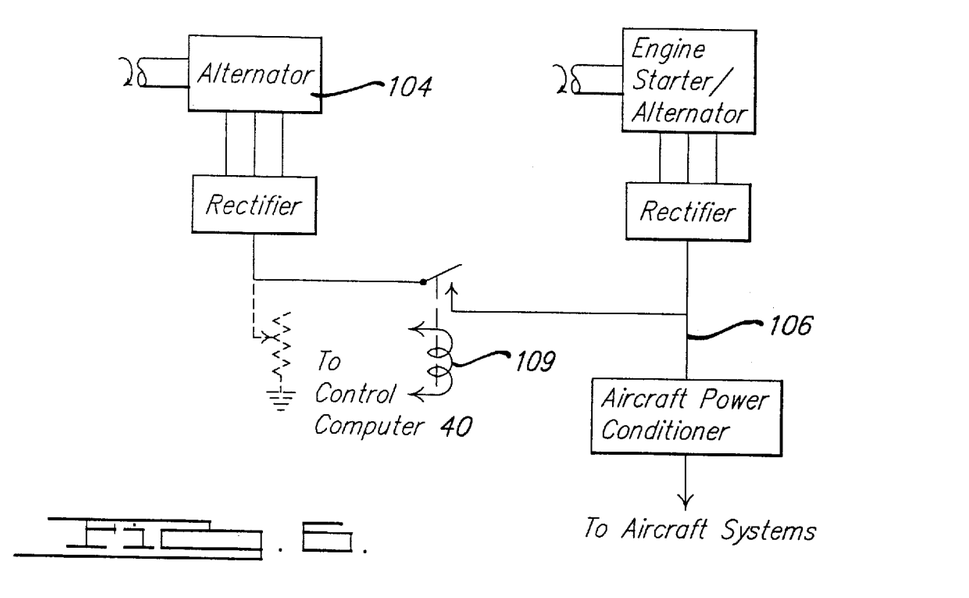
FIG. 6 is an electrical schematic in accordance with an alternative embodiment of the instant invention.

In an alternate embodiment of the instant invention as shown in FIG. 6, the alternating current output of the turbo-alternator 100 is provided as a source input to a known-in-the-art voltage rectifier circuit that produces direct current voltage supplying the direct current bus 106 used to operate many aircraft components. This embodiment of the instant invention allows the air cycle machine turbo-alternator 100 to operate at a rotational velocity dictated only by ram air inlet conditions, cooling air requirements, or cabin pressurization requirements, thereby obviating the need to synchronize the speed of the turbo-alternator 100 with that of the engine alternator.

In an alternative embodiment of the instant invention as shown in both FIGS. 5 and 6, an electrical disconnect 109 is provided to electrically isolate the power produced by the turbo-alternator 100 from the power produced by the aircraft alternator. The disconnect 109 is activated an deactivated responsive to a binary output form the control computer 40 depending upon aircraft power requirements. When the aircraft is on the ground the disconnect 109 is activated by the control computer 40 to provide either AC or DC electrical power thereto. Alternatively, when AC power is supplied to the aircraft by the turbo-alternator 100, the disconnect 109 is deactivated until the control computer 40 has synchronized the rotational velocity of the turbo-alternator 100 with that of the engine alternator, thereby providing power at precise frequencies. While the preferred embodiment of the instant invention utilizes an electromechanical relay as a disconnect 109, devices such as solid state relays or TTL switches may be employed, as is well known to one of ordinary skill in the art.

As the working fluid expands through the turbo-alternator 100, its temperature significantly decreases, as predicted by the gas law (PV=NRT). The cooled working fluid is thence directed through a conventional water separator 110 to reduce the moisture content of the cooled, pressurized air prior to its introduction into the cabin 12 of the aircraft. The cooled dry air exits the water separator 110 and enters a mixer 120 for mixing with uncooled working fluid as a means of regulating the cabin 12 temperature. The mixer has a first inlet port 122 in fluid communication with the water separator 110, a second inlet port 124, and an outlet 126. An electrically controlled temperature control valve 130 has an inlet port 132 in fluid communication with the second outlet 58 of the selector valve 50, and an outlet port 134 in fluid communication with the second inlet port 124 of the mixer 120. The temperature control valve 130 is responsive to an output from the control computer 40 that is varied in accordance with a desired cabin 12 temperature. An input to the control computer 40 indicative of cabin 12 temperature, for example a thermocouple or RTD array, allows the computer 40 to vary the position of the temperature control valve 130 to combine a portion of the compressor bleed air in the mixer 120 with the cool dry air produced by the air cycle cooling circuit 60, thereby maintaining cabin temperature at a predetermined set-point. As lower cabin 12 temperatures are desired, the temperature control valve 130 is closed by the control computer 40, thus restricting the amount of compressor bleed air available to the mixer 120 and thereby reducing the temperature of the air supplied to the cabin 12. The mixer may further comprise a baffle, or a series thereof, arranged therein to create turbulent airflow and allow the cooled air to mix thoroughly with the warm compressor bleed air.

A mechanical check valve 136 having an outlet in fluid communication with the full bleed line 56 and the cabin 12 of the aircraft is arranged in fluid communication with the outlet of the mixer 120. The check valve 136 is oriented to prevent fluid flow from the cabin 12 (or the full bleed line 56) into the mixer 120.

An electrically operated pressure control valve 140 responsive to an output from the control computer 40 has an inlet 142 in fluid communication with the cabin 12 of the aircraft and an outlet 144 that exhausts to atmosphere for regulating cabin 12 pressurization. Cabin 12 pressure is maintained at a level consistent with the atmospheric pressure at the arrival and departure points of the aircraft, according to barometric pressure at those locations.

The control computer 40 is provided with a look-up table containing therein the altitudes relative to sea level, and corresponding atmospheric pressure, of all known airports. The aircraft pilot enters a departure and destination location to the control computer 40 using an appropriate operator interface. The control computer 40 then calculates an approximate flight time based upon the distance between the arrival and departure locations and the normal cruising speed of the aircraft. The control computer 40 then varies the pressurization of the cabin 12 by opening or closing the pressure control valve such that upon arrival, cabin pressure is identical to the atmospheric pressure at the destination. In the preferred embodiment of the instant invention, the pressure difference between the arrival and departure locations is adjusted linearly over the course of the flight, thereby minimizing the effects of abrupt pressure changes on aircraft passengers and crew.

An mechanical differential pressure valve 150 having an inlet 152 in fluid communication with the cabin 12 of the aircraft and an outlet 154 that exhausts to atmosphere is provided to limit the difference between cabin pressure and ambient pressure to prevent the environmental control system 10 from pressurizing the cabin 12 in excess of the design limit for the ratio of internal to external cabin pressure. If cabin pressure is greater than atmospheric pressure by a predetermined amount, the differential pressure valve 150 opens to exhaust pressurized air from the cabin 12 to atmosphere, thereby reducing the ratio of internal to external cabin pressure.

In an alternative embodiment of the instant invention as shown in FIG. 7, the air cycle cooling circuit 60 further comprises a compressor 160 having an inlet 162 in fluid communication with the selector valve outlet 58, and an outlet 164 for supplying the bypass duct heat exchanger 70 with working fluid. The compressor 160 is driven by the turbine 102 via a shaft 166 in a bootstrap arrangement to produce compressed air as a working fluid for the bypass duct heat exchanger 70. The addition of the compressor 160 in the air cycle cooling circuit 60 allows very low pressure and temperature air to be bled from the engine 14 compressor to supply the air cycle cooling circuit 60, thereby enhancing the thermodynamic efficiency of the engine 14.

While the preferred embodiments of the instant invention have been disclosed in detail, it will be appreciated by one of ordinary skill in the art that the instant invention is susceptible to various modifications without departing from the scope of the following claims.

We claim:

1. An environmental control unit for an aircraft having a control computer having a plurality of inputs and outputs, a cabin, and a turbine engine having a compressor, a bypass duct, an engine nacelle, and an alternator comprising:

a plurality of bleed air lines in fluid communication with said compressor for supplying pressurized working fluid to said environmental control unit;

a bleed air selector valve responsive to an output from said control computer in fluid communication with said plurality of bleed air lines for selecting a one of said bleed air lines as a source of working fluid;

a pressure regulator in fluid communication with said bleed air selector valve for limiting the pressure of the working fluid;

a selector valve responsive to an output from said control computer having an inlet in fluid communication with said pressure regulator, a first outlet in fluid communication with said aircraft cabin via a full bleed line to supply working fluid thereto in the event of a catastrophic failure of said environmental control unit, and a second outlet;

an air cycle cooling circuit for supplying cool dry air to said aircraft cabin comprising:

a bypass duct heat exchanger disposed in the bypass duct of said turbine engine, in fluid communication with the second outlet of said selector valve for cooling the working fluid;

a nacelle heat exchanger in fluid communication with said bypass duct heat exchanger having a ram air inlet and outlet for allowing flow of a cooling fluid therein, and an outlet for the working fluid;

a fan responsive to an output from said control computer disposed in fluid communication with said nacelle heat exchanger for enhancing the flow of cooling fluid therein;

a speed control valve responsive to an output from said control computer having an inlet in fluid communication with the outlet of said nacelle heat exchanger and an outlet for varying the flow of working fluid therethrough;

a turbo-alternator having an inlet in fluid communication with the outlet of said speed control valve, a turbine driven by the working fluid, a high speed alternator driven by the turbine to produce alternating current power for said aircraft, and an outlet;

a water separator having an inlet connected to the outlet of said turbo-alternator for separating water from the working fluid, and an outlet therefor; and a mixer for mixing cooled working fluid with compressor bleed air having a first inlet in fluid communication with the outlet of said water separator, a second inlet for compressor bleed air, and an outlet;

a temperature control valve responsive to an output from said control computer having an inlet in fluid communication with the second outlet of said selector valve and an outlet in fluid communication with the inlet of said mixer for varying the flow of uncooled compressor bleed air into said mixer;

a mechanical check valve having an inlet in fluid communication with the outlet of said mixer and an outlet in fluid communication with the cabin of said aircraft to prevent fluid flow from the cabin into said mixer;

a pressure control valve responsive to an output from said control computer having an inlet in fluid communication with said cabin and an outlet that exhausts to atmosphere for controlling the pressure in said cabin; and a differential pressure valve having an inlet in fluid communication with said cabin and an outlet that exhausts to atmosphere, for limiting the maximum pressurization of said aircraft cabin.

2. An environmental control unit as claimed in claim 1 wherein said bypass duct heat exchanger comprises a plurality of heat exchanging elements.

3. An environmental control unit as claimed in claim 1 further comprising an outlet damper disposed at the outlet of said nacelle heat exchanger for controlling the flow of cooling fluid therein.

4. An environmental control unit as claimed in claim 1 further comprising a first input to said control computer indicative of the rotational velocity of said turbo-alternator and a second input to said control computer indicative of the rotational velocity of said engine alternator, wherein said speed control valve is positioned responsive to the output from said control computer to synchronize the rotational velocity of said turbo-alternator with that of the engine alternator.

5. An environmental control unit as claimed in claim 1 further comprising a voltage rectifier circuit electrically connected to the high speed alternator for converting the alternating current power produced thereby into direct current power.

6. An environmental control unit as claimed in claim 1 wherein said pressure control valve is positioned responsive to the output from said control computer to vary the pressure in the aircraft cabin from ambient pressure at a departure location to ambient pressure at an arrival location over the course of an aircraft flight.

7. An environmental control unit for an aircraft having a control computer having a plurality of inputs and outputs, a cabin, and a turbine engine having a compressor, a bypass duct, an engine nacelle, and an alternator comprising:

a plurality of bleed air lines in fluid communication with said compressor for supplying pressurized working fluid to said environmental control unit;

a first bleed air selector valve responsive to an output from said control computer in fluid communication with said plurality of bleed air lines for selecting a one of said bleed air lines as a source of working fluid;

a second bleed air selector valve responsive to an output from said control computer in fluid communication with said plurality of bleed air lines for selecting a one of said bleed air lines as a source of working fluid;

a first pressure regulator having an inlet in fluid communication with said first bleed air selector valve for limiting the pressure of the working fluid and an outlet;

a second pressure regulator having an inlet in fluid communication with said second bleed air selector valve for limiting the pressure of the working fluid and an outlet;

a full bleed valve responsive to an output from said control computer having an inlet in fluid communication with a one of said plurality of bleed air lines and an outlet in fluid communication with said cabin via a full bleed line to supply working fluid thereto in the event of a catastrophic outlet of said environmental control unit;

an air cycle cooling circuit for supplying cool dry air to said aircraft cabin comprising:

a bypass duct heat exchanger disposed in the bypass duct of said turbine engine, in fluid communication with the outlet of said first pressure regulator for cooling the working fluid;

a nacelle heat exchanger in fluid communication with said bypass duct heat exchanger having a ram air inlet and outlet for allowing flow of a cooling fluid therein, and an outlet for the working fluid;

a fan responsive to an output from said control computer disposed in fluid communication with said nacelle heat exchanger for enhancing the flow of cooling fluid therein;

a speed control valve responsive to an output from said control computer having an inlet in fluid communication with the outlet of said nacelle heat exchanger and an outlet for varying the flow of working fluid therethrough;

a turbo-alternator having an inlet in fluid communication with the outlet of said speed control valve, a turbine driven by the working fluid, a high speed alternator driven by the turbine to produce alternating current power for said aircraft, and an outlet;

a water separator having an inlet connected to the outlet of said turbo-alternator for separating water from the working fluid, and an outlet therefor; and a mixer for mixing cooled working fluid with compressor bleed air having a first inlet in fluid communication with the outlet of said water separator, a second inlet for compressor bleed air, and an outlet;

a temperature control valve responsive to an output from said control computer having an inlet in fluid communication with the outlet of said second pressure regulator and an outlet in fluid communication with the inlet of said mixer for varying the flow of uncooled compressor bleed air into said mixer;

a mechanical check valve having an inlet in fluid communication with the outlet of said mixer and an outlet in fluid communication with the cabin of said aircraft to prevent fluid flow from the cabin into said mixer;

a pressure control valve responsive to an output from said control computer having an inlet in fluid communication with said cabin and an outlet that exhausts to atmosphere for controlling the pressure in said cabin; and a mechanically operated differential pressure valve having an inlet in fluid communication with said cabin and an outlet that exhausts to atmosphere, for limiting the maximum pressurization of said aircraft cabin.

8. An environmental control unit as claimed in claim 7 wherein said bypass duct heat exchanger comprises a plurality of heat exchanging elements.

9. An environmental control unit as claimed in claim 7 further comprising an outlet damper disposed at the outlet of said nacelle heat exchanger for controlling the flow of cooling fluid therein.

10. An environmental control unit as claimed in claim 7 further comprising a first input to said control computer indicative of the rotational velocity of said turbo-alternator and a second input to said control computer indicative of the rotational velocity of said engine alternator, wherein said speed control valve is positioned responsive to the output from said control computer to synchronize the rotational velocity of said turbo-alternator with that of the engine alternator.

11. An environmental control unit as claimed in claim 2 further comprising a voltage rectifier circuit electrically connected to the high speed alternator for converting the alternating current power produced thereby into direct current power.

12. An environmental control unit as claimed in claim 2 wherein said pressure control valve is positioned responsive to the output from said control computer to vary the pressure in the aircraft cabin from ambient pressure at a departure location to ambient pressure at an arrival location over the course of an aircraft flight.

13. An environmental control unit for an aircraft having a control computer having a plurality of inputs and outputs, a cabin, and a turbine engine having a compressor, a bypass duct, an engine nacelle, and an alternator comprising:

a plurality of bleed air lines in fluid communication with said compressor for supplying pressurized working fluid to said environmental control unit;

a bleed air selector valve responsive to an output from said control computer in fluid communication with said plurality of bleed air lines for selecting a one of said bleed air lines as a source of working fluid;

a pressure regulator in fluid communication with said bleed air selector valve for limiting the pressure of the working fluid;

a selector valve responsive to an output from said control computer having an inlet in fluid communication with said pressure regulator, a first outlet in fluid communication with said aircraft cabin via a full bleed line to supply working fluid thereto in the event of a catastrophic failure of said environmental control unit, and a second outlet;

an air cycle cooling circuit for supplying cool dry air to said aircraft cabin comprising:

a compressor having an inlet in fluid communication with the second outlet of said selector valve and an outlet, for compressing working fluid for the air cycle cooling circuit;

a bypass duct heat exchanger disposed in the bypass duct of said turbine engine, in fluid communication with the outlet of said compressor for cooling the working fluid;

a nacelle heat exchanger in fluid communication with said bypass duct heat exchanger having a ram air inlet and outlet for allowing flow of a cooling fluid therein, and an outlet for the working fluid;

a fan responsive to an output from said control computer disposed in fluid communication with said nacelle heat exchanger for enhancing the flow of cooling fluid therein;

a speed control valve responsive to an output from said control computer having an inlet in fluid communication with the outlet of said nacelle heat exchanger and an outlet for varying the flow of working fluid therethrough;

a turbo-alternator having an inlet in fluid communication with the outlet of said speed control valve, a turbine driven by the working fluid, a high speed alternator driven by the turbine to produce alternating current power to said aircraft, and an outlet, said turbo-alternator further driving a shaft mechanically coupled to said compressor for rotation thereof;

a water separator having an inlet connected to the outlet of said turbo-alternator for separating water from the working fluid, and an outlet therefor; and a mixer for mixing cooled working fluid with compressor bleed air having a first inlet in fluid communication with the outlet of said water separator, a second inlet for compressor bleed air, and an outlet;

a temperature control valve responsive to an output from said control computer having an inlet in fluid communication with the second outlet of said selector valve and an outlet in fluid communication with the inlet of said mixer for varying the flow of uncooled compressor bleed air into said mixer;

a mechanical check valve having an inlet in fluid communication with the outlet of said mixer and an outlet in fluid communication with the cabin of said aircraft to prevent fluid flow from the cabin into said mixer;

a pressure control valve responsive to an output from said control computer having an inlet in fluid communication with said cabin and an outlet that exhausts to atmosphere for controlling the pressure in said cabin; and a mechanically operated differential pressure valve having an inlet in fluid communication with said cabin and an outlet that exhausts to atmosphere, for limiting the maximum pressurization of said aircraft cabin.

14. An environmental control unit as claimed in claim 13 wherein said bypass duct heat exchanger comprises a plurality of heat exchanging elements.

15. An environmental control unit as claimed in claim 13 further comprising an outlet damper disposed at the outlet of said nacelle heat exchanger for controlling the flow of cooling fluid therein.

16. An environmental control unit as claimed in claim 13 further comprising a first input to said control computer indicative of the rotational velocity of said turbo-alternator and a second input to said control computer indicative of the rotational velocity of said engine alternator, wherein said speed control valve is positioned responsive to the output from said control computer to synchronize the rotational velocity of said turbo-alternator with that of the engine alternator.

17. An environmental control unit as claimed in claim 13 further comprising a voltage rectifier circuit electrically connected to the high speed alternator for converting the alternating current power produced thereby into direct current power.

18. An environmental control unit as claimed in claim 13 wherein said pressure control valve is positioned responsive to the output from said control computer to vary the pressure in the aircraft cabin from ambient pressure at a departure location to ambient pressure at an arrival location over the course of an aircraft flight.

* * * * *